US009873829B2

(12) United States Patent
Al-Mutairi et al.

(10) Patent No.: US 9,873,829 B2
(45) Date of Patent: Jan. 23, 2018

(54) DUAL-PHASE ACID-BASED FRACTURING COMPOSITION WITH CORROSION INHIBITORS AND METHOD OF USE THEREOF

(71) Applicant: Saudi Arabian Oil Company, Dhahran (SA)

(72) Inventors: Saleh H. Al-Mutairi, Dhahran (SA); Yaser K. Al-Duailej, Dhahran (SA); Ibrahim S. Al-Yami, Dhahran (SA); Abdullah M. Al-Hajri, Dhahran (SA); Hameed H. Al-Badairy, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 194 days.

(21) Appl. No.: 14/830,419

(22) Filed: Aug. 19, 2015

(65) Prior Publication Data
US 2015/0353814 A1    Dec. 10, 2015

Related U.S. Application Data

(62) Division of application No. 13/682,405, filed on Nov. 20, 2012, now Pat. No. 9,145,512.

(60) Provisional application No. 61/563,287, filed on Nov. 23, 2011.

(51) Int. Cl.
  *C09K 8/54*    (2006.01)
  *C09K 8/74*    (2006.01)
  *E21B 43/26*    (2006.01)
  *C09K 8/68*    (2006.01)

(52) U.S. Cl.
  CPC ............. *C09K 8/74* (2013.01); *C09K 8/54* (2013.01); *C09K 8/68* (2013.01); *E21B 43/26* (2013.01); *C09K 2208/32* (2013.01)

(58) Field of Classification Search
  CPC ... C09K 8/36; C09K 8/74; C09K 8/68; C09K 8/54; C09K 8/602; C09K 8/685; C09K 8/887; C09K 8/28; C09K 8/32; C09K 8/584; C09K 15/30; C09K 2208/02; C09K 2208/10; C09K 2208/26; C09K 2208/32; C09K 5/10; C09K 8/035; C09K 8/12; C09K 8/24; C09K 8/34; C09K 8/487; C09K 8/5045; C09K 8/508; C09K 8/52; C09K 8/528; C09K 8/588; C09K 8/665; C09K 8/706; C09K 8/82; C09K 8/88; C09K 8/882; E21B 43/26; E21B 21/00; E21B 21/065; E21B 44/00; E21B 17/20; E21B 21/08; E21B 33/068; E21B 33/13; E21B 41/02; E21B 43/16; E21B 43/25; E21B 43/255
  See application file for complete search history.

(56) References Cited

U.S. PATENT DOCUMENTS

| | | | | |
|---|---|---|---|---|
| 3,434,545 | A | * | 3/1969 | Bombardieri ............ C09K 8/74 166/307 |
| 3,490,237 | A | * | 1/1970 | Lissant ................... B01F 17/00 149/108.8 |
| 4,359,391 | A | | 11/1982 | Salathiel et al. |
| 4,964,468 | A | | 10/1990 | Adams et al. |
| 5,027,901 | A | * | 7/1991 | French ..................... C09K 8/54 166/310 |
| 5,034,140 | A | | 7/1991 | Gardner et al. |
| 5,300,235 | A | | 4/1994 | Clewlow et al. |
| 5,355,958 | A | | 10/1994 | Pauls et al. |
| 5,753,596 | A | | 5/1998 | Martin et al. |
| 5,916,484 | A | | 6/1999 | Brezinski |
| 6,435,277 | B1 | | 8/2002 | Qu et al. |
| 6,436,880 | B1 | | 8/2002 | Frenier |
| 6,464,009 | B2 | | 10/2002 | Bland et al. |
| 6,467,492 | B2 | | 10/2002 | Hopkins et al. |
| 6,571,687 | B1 | | 6/2003 | Collins et al. |
| 7,666,821 | B2 | | 2/2010 | Fu |
| 7,704,927 | B2 | | 4/2010 | Qu et al. |
| 7,842,127 | B2 | | 11/2010 | Malwitz |
| 7,851,414 | B2 | | 12/2010 | Yang et al. |
| 7,902,124 | B2 | | 3/2011 | Ali et al. |
| 7,915,205 | B2 | | 3/2011 | Smith et al. |
| 8,039,422 | B1 | * | 10/2011 | Al-Zahrani ............. C09K 8/54 166/305.1 |
| 2006/0166835 | A1 | * | 7/2006 | Yang ........................ C09K 8/26 507/200 |
| 2009/0131285 | A1 | | 5/2009 | Wang et al. |

OTHER PUBLICATIONS https://en.wikipedia.org/w/index.php?title=Diesel_fuel&printable=yes downloaded on Apr. 24, 2017.*
O. Obodeh, F.O. Isaac, Investigation of performance characteristics of diesel engine fuelled with diesel-kerosene blends, Journal of Emerging Trends in Engineering and Applied Sciences (JETEAS), 2011, 2, 318-322.*
Ferreira, Pedro, et al.; "Effect of Flow on Corrosion in Catenary Risers and Its Corrosions Inhibitor Performance" Brazilian Petroleum, Gas and Biofuels Institute, Rio Pipeline 2009 Conference & Exposition, Brazil, Sep. 22, 2009; pp. 1-8.
Miksic, Boris M., et al.; "Effectiveness of the Corrosion Inhibitors for the Petroleum Industry Under Various Flow Conditions" Paper No. 09573, Nance International Corrosion 2009 Conference & Expo, 2009; pp. 1-9.
Obodeh et al., "Investigation of Performance Characteristics of Diesel Engine Fuelled with Diesel-Kerosene Blends", Journal of Emerging Trends in Engineering and Applied Sciences, 2011, vol. 2; pp. 318-322.
PCT Notification of Transmittal of the International Search Report and the Written Opinion of the International Searching Authority, or Declaration; dated Feb. 28, 2013; International Appln No. PCT/US2012/065999 (SA780/PCT); pp. 1-14.

(Continued)

*Primary Examiner* — Kumar R Bhushan
(74) *Attorney, Agent, or Firm* — Bracewell LLP; Constance G. Rhebergen; Brian H. Tompkins

(57) ABSTRACT

A dual-phase acid-based fracturing composition with corrosion inhibitors and method for use in acid-based matrix and fracturing operations in oil and gas wells is provided. The composition includes an acid, a hydrocarbon, a hydrocarbon-soluble corrosion inhibitor, an acid-soluble corrosion inhibitor, and an acid-soluble inhibitor aid.

8 Claims, 2 Drawing Sheets

(56) References Cited

OTHER PUBLICATIONS

Bybee, Karen, "A Small-Scale Fracture-Conductivity Study" 2007 SPE Hydraulic Fracturing Technology Conference, College Station, TX; Jan. 29-31, 2007, pp. 47-48.

Reynolds, Rodney R.; "Produced Water and Associated Issues" PTTC Resource Center, 2003, Oklahoma Geological Survey Open-File Report 6-2003; pp. 1-65.

Salama, Mamdouh M., et al.; "A Study of Factors Affecting CO2 Corrosion and Inhibitor Effectiveness Using a Multi-Phase FlowLoop" NACE International Corrosion 2009 Conference & Expo, 2009 Nace International, pp. 1-17.

Tarvainen, Maarit, et al.; "Enhanced film-forming properties for ethyl cellulose and starch acetate using n-alkenyl succinic anhydrides as novel plasticizers" European Journal Pharmaceutical Sciences 19 (2003); pp. 363-371.

\* cited by examiner

US 9,873,829 B2

DUAL-PHASE ACID-BASED FRACTURING COMPOSITION WITH CORROSION INHIBITORS AND METHOD OF USE THEREOF

RELATED APPLICATIONS

This application is a divisional of U.S. patent application Ser. No. 13/682,405, filed Nov. 20, 2012, which claims priority to U.S. Provisional Patent Application No. 61/563,287, filed Nov. 23, 2011, the disclosures both of which are incorporated herein by reference in their entirety.

FIELD OF THE INVENTION

This invention relates to a composition and method for inhibiting corrosion during acid stimulation treatments in oil and gas wells. More specifically, the invention relates to a fluid composition and method of using the fluid composition to coat the metal tubing and downhole equipment of the well during both the injection and the flowback phases.

BACKGROUND OF THE INVENTION

During well operations, "matrix acidizing" and "acid fracturing" methods are employed to enhance the productivity of hydrocarbon wells. In general, acid or acid-based fluids are injected into the well tubing (the "injection phase") and into the formation rock. These acids dissolve or partially dissolve the formation rock, creating alternative flow paths for hydrocarbons. After the acids are "spent" in the formation rock, they are returned to the surface through the same well tubing during the "flowback phase".

One of the difficulties encountered when acid-based fracturing methods are employed is that most of the well tubing and downhole equipment is made of metal. In traditional acid-based fracturing methods utilized in oil wells, particularly as temperatures and pressures increase, the injected acids are corrosive to the metal tubing and the downhole equipment. To help prevent this, corrosion inhibitors are typically added to the acids. The corrosion inhibitors act to coat the metal and minimize the corrosive effects of the acids. As temperatures and pressures increase, acid reactivity also increases and increased amounts of inhibitor are needed to compensate for the increased reactivity.

Another difficulty encountered in typical acid-based fracturing methods is that after the acid is "spent"—injected into the formation rock for acid fracturing purposes—the acid still retains corrosive properties that will damage metal on its return to the surface during the "flowback phase". Most prior art corrosion inhibitors work by coating the metal tubing during the "injection phase," and the inhibitors typically are then consumed during this phase of the operation. After the acids have passed through the formation rock, little to no inhibition content is available to protect the well equipment during the "flowback phase" of the operation.

The cost of corrosion inhibitors in acid-based operations is a major contributor to the overall cost of the fracturing operation. Because of their corrosive properties, the most effective acids for fracturing require inhibitor dosages that lie outside of economic feasibility. Additionally, the "spent acids" can damage the well equipment during the "flowback phase". Therefore, it would be advantageous to use a composition capable of protecting the well equipment, including pipes, electric submersible pumps (ESPs), and other downhole tools, in both the injection and flowback phases.

SUMMARY OF THE INVENTION

The present invention provides for a dual-phase acid-based fracturing composition with corrosion inhibitors and method for mixing and using the composition such that the metal parts of the well tubing and downhole equipment are protected from the corrosive effects of the acid, during both the injection and flowback phases. The composition consists of a dual-phase acid-in-hydrocarbon emulsion, with a separate corrosion inhibitor present in each of the different phases. When the composition is injected into the formation rock during the "injection phase", the hydrocarbon-soluble corrosion inhibitor coats the interior of the metal tubing, forming a protective film. The acid-soluble corrosion inhibitor remains present in the acid fluids during the injection phase and the stimulation of the formation, and is not spent until the flowback phase.

In one aspect, the dual-phase acid-based fracturing composition includes an acid, a liquid hydrocarbon, an emulsifier, a hydrocarbon-soluble corrosion inhibitor, and an acid-soluble corrosion inhibitor. The combination of the acid, the liquid hydrocarbon, the emulsifier, the hydrocarbon-soluble corrosion inhibitor, and the acid-soluble corrosion inhibitor is operable to protect the metal tubing and equipment of an oil and gas well during both the injection and flowback phases of acid-based fracturing operations.

In certain embodiments, the acid can be selected from HCl (hydrochloric acid) and is present in concentrations ranging up to about 28% by weight and present in the emulsion in concentrations ranging from about 50-80% by volume. In certain embodiments, the hydrocarbon can be a low-viscosity, low-sulfur diesel, alternatively having a diesel mixture that includes hydrocarbons ranging between about 10-15 carbon atoms. In alternative embodiments, the hydrocarbon-soluble inhibitor can be present in concentrations ranging from about 0.01 to 3% by volume, relative to the amount of hydrocarbon present in the composition, and the acid-soluble inhibitor can be present in concentrations ranging from about 0.01 to 3% by volume, relative to the acid present in the composition. In other embodiments, the acid can include at least one strong acid at any concentration, and the hydrocarbon can be any liquid hydrocarbon with more than 5 carbon atoms.

In one aspect, the present invention relates to a method of preparing a corrosion inhibiting fracturing composition. The corrosion inhibiting composition includes a dual-phase acid-in-hydrocarbon emulsion with two corrosion inhibitors, such that a hydrocarbon-soluble corrosion inhibitor is present in the hydrocarbon phase, and an acid-soluble inhibitor is present in the acid phase. The method includes the steps of preparing the hydrocarbon phase and the acid phase separately before mixing with an emulsifier. In one embodiment, the emulsifier can be an amine-based surfactant. In certain embodiments, the emulsifier is dissolved in an organic solvent.

In one embodiment, the hydrocarbon phase can be prepared by adding the emulsifier and the hydrocarbon-soluble corrosion inhibitor to the hydrocarbon in a mixing device. In other embodiments, the hydrocarbon phase can be prepared by any mixing technique. The acid phase can be prepared by adding an acid-soluble corrosion inhibitor to the acid.

In one embodiment, an acid-soluble corrosion inhibitor aid is added to the acid phase in concentrations ranging between about 0.1 to 3% by volume, relative to the amount of acid present in the composition.

In one embodiment, the acid-in-hydrocarbon emulsion is prepared by adding the acid phase to the emulsified hydrocarbon drop wise, at a constant speed, to ensure the emulsion is uniform. In other embodiments, the acid can be added to the hydrocarbon using any mixing technique.

DETAILED DESCRIPTION OF THE INVENTION

Figure 1:
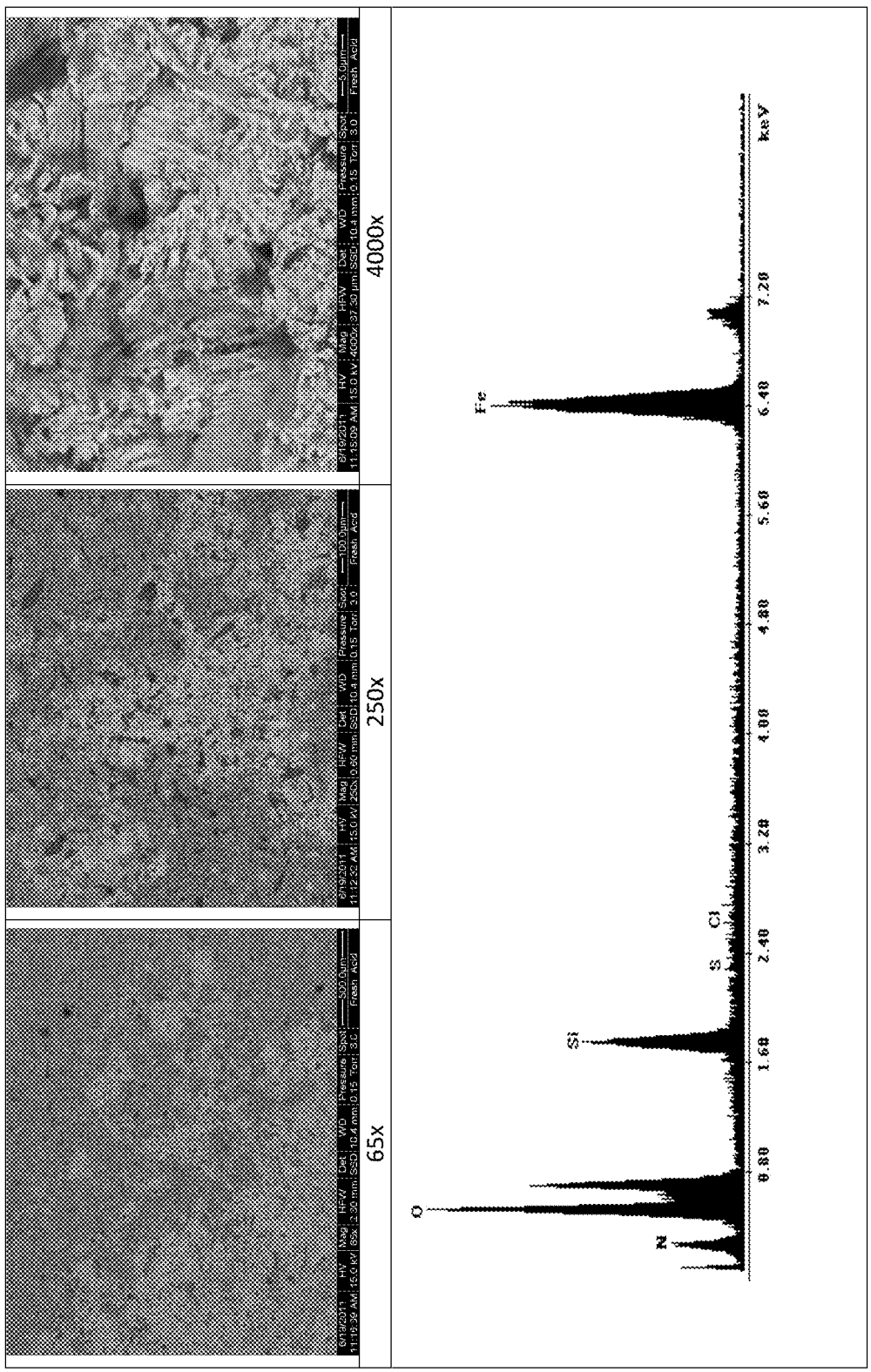
FIG. 1 provides scanning electron microscope analysis of the surface of a metal coupon after being treated with the dual-phase corrosion inhibitor during the injection phase according to embodiments of the present invention.

Although the following detailed description contains many specific details for purposes of illustration, it is understood that one of ordinary skill in the art will appreciate that many examples, variations and alterations to the following details are all within the scope and spirit of the invention. Accordingly, the exemplary embodiments of the invention described herein are set forth without any loss of generality, and without imposing limitations, relating to the claimed invention.

The present invention addresses problems associated with prior art methods and compositions used in acid-based fracturing operations to effectively fracture the formation rock while at the same time preventing acid corrosion in oil and gas wells.

As used herein, "formation" and "formation rock" refer to the rock around the borehole of an oil and gas well, including formations comprised of calcium carbonate rock.

The dual-phase acid-based fracturing composition described herein generally includes an acid, a liquid hydrocarbon, an emulsifier, a hydrocarbon-soluble corrosion inhibitor, and an acid-soluble corrosion inhibitor. In addition to being used for fracturing the formation rock, the composition fluids form a protective film that coats metal tubing and downhole equipment during both the injection and flowback phases of acid fracturing operations. Therefore, in certain embodiments, the dual-phase acid-based fracturing composition fluids exist in an acid-in-hydrocarbon emulsion, with a separate corrosion inhibitor present in each phase. In the injection phase, the dual-phase acid-based fracturing composition is injected into the formation rock. During injection, the hydrocarbon-soluble corrosion inhibitor present in the composition acts to coat the interior of the metal tubing and downhole equipment, protecting their surfaces from the corrosive effects of the injected acid. After injection, the composition enters the formation rock to part or open fractures in the formation and to etch pathways in the formation rock. The acid-soluble corrosion inhibitor remains present in the acid fluids during injection and is not spent until the flowback phase.

In one aspect, the present invention is directed to a dual-phase acid-based fracturing composition that includes at least two corrosion inhibitors for use in fracturing the formation rock while also preventing the corrosion of metal tubing and downhole equipment in the wells. In certain embodiments, the composition exists as a dual-phase acid-in-hydrocarbon emulsion. Advantageously, the dual-phase composition includes at least two separate corrosion inhibitors, at least one present in the acid phase, and at least one present in the hydrocarbon phase.

As used herein, "acid" refers to any group of strong acids that ionize completely in an aqueous solution by losing one proton. Furthermore, "acid fracturing operations" refers to the process of using acid to part or open fractures in formation rock and to etch pathways along the fractures, for the purpose of increasing rock permeability near the wellbore. When the acid comes into contact with the metal tubing and equipment present in the well, corrosion of the metal occurs.

As used herein, "corrosion inhibitor" refers to a chemical additive used in acid-based treatments to protect metal components in the wellbore and treating equipment from the corrosive effects of the acid fluids. As used herein, corrosion inhibitors generally adsorb on the metal surface and form a protective film.

As used herein "spent acid" refers the composition fluids that remain after the composition has reacted with formation rock.

As used herein, "injection phase" refers to the first phase of acid fracturing operations, in which the acid-based composition fluids are first injected into the well tubing, before they reach the formation rock. Additionally, "flowback phase" refers to the last phase of acid fracturing operations in which fluids that remain in the formation rock after acid fracturing return back up the metal tubing, towards the surface of the well.

In certain embodiments, the corrosion inhibitor present in the hydrocarbon phase is used during the injection phase to coat and protect the metal tubing and well equipment. The corrosion inhibitor present in the acid phase is not generally used or spent during the injection phase, and is available to form the protective coating on the metal tubing and equipment during the flowback phase.

In certain embodiments, the hydrocarbon can be selected from any class of liquid hydrocarbons having more than 5 carbon atoms, alternatively in a range of about 10-15 carbon atoms, or in a range of about 15-20 carbon atoms. Certain hydrocarbons for use in the present invention can include diesels and low-sulfur diesels. The hydrocarbon-soluble corrosion inhibitor can be present in the hydrocarbon phase in an amount which ranges between about 0.01% to 3% by volume, relative to the amount of hydrocarbon present. In certain embodiments, the hydrocarbon-soluble corrosion inhibitor can be obtained from a commercial supplier. In certain embodiments, the hydrocarbon-soluble corrosion inhibitor can be an alcohol based inhibitor such as COAT-B1400 (Nalco Champion, Houston, Tex.). In other embodiments, the hydrocarbon-soluble corrosion inhibitor can be selected from standard methanols.

In certain embodiments, the emulsifier selected can be an anime-based surfactant dissolved in an organic solvent. "Amine-based surfactant" refers to a group of cationic surfactants that have a positively charged head group. The emulsifier can be present in the composition by about 0.05 to 1.5% by volume, relative to the volume of the hydrocarbon present. In certain embodiments, the emulsifier can be an emulsified-acid additive such as the U108 emulsifier (Schlumberger Technology Corporation, Sugar Land, Tex.). In other embodiments, the emulsifier can be a cationic surfactant selected from a group of linear alkyl-amines and alkyl-ammoniums.

The acid can include one or more members selected from the group of strong acids. The acid component of the dual-phase acid-based fracturing composition will typically be present in high concentrations, such as about 50-80% by volume of the composition. In certain embodiments, the acid can be highly concentrated hydrochloric acid (HCl).

The acid-soluble corrosion inhibitor can be obtained from a commercial supplier and can be present in the acid phase in an amount which ranges between about 0.01 to 3% by volume, relative to the amount of acid present. In certain embodiments, the acid-soluble inhibitor is corrosion inhibitor such as the A262 inhibitor (Schlumberger Technology Corporation, Sugar Land, Tex.). In certain embodiments, the acid-soluble corrosion inhibitor does not have surfactant properties.

In certain embodiments, an acid-soluble corrosion inhibitor aid can be added to the acid phase. The inhibitor aid can be selected from a commercial supplier and can be present in the acid phase in an amount which ranges between 0 and 3% by volume. If used, in certain embodiments, the inhibitor aid can be the A201 inhibitor aid (Schlumberger Technology Corporation, Sugar Land, Tex.). In other embodiments, the inhibitor aid can be selected from formic acid.

In another aspect, the present invention provides a method for making a dual-phase acid-based fracturing composition such that an acid-in-hydrocarbon emulsion with two corrosion inhibitors is prepared. In certain embodiments, the two phases are prepared separately and then mixed together. To prepare the acid phase according to the present invention, an acid is chosen and diluted with treatment water to an operable concentration. An acid-soluble corrosion inhibitor is then selected and added to the acid and mixed thoroughly to produce the acid phase of the emulsion. In certain embodiments, an inhibitor aid can be added to the acid phase in order to increase the effectiveness of the acid-phase inhibitor during the flowback phase of acid based fracturing operations.

To prepare the hydrocarbon phase, an amine-based emulsifier is selected and then dissolved in an organic solvent such as acetone or methanol. A liquid hydrocarbon is selected to which the emulsifier is added until the two compounds are thoroughly mixed. A hydrocarbon-soluble corrosion inhibitor is then selected and added to the liquid hydrocarbon to produce the emulsified hydrocarbon phase. The acid phase is then added to the emulsified hydrocarbon phase.

The acid phase and the emulsified hydrocarbon phase of the present invention are combined and mixed, preferably drop wise. Adding the acid phase to the hydrocarbon phase drop wise creates a more uniform acid-in-hydrocarbon emulsion and produces the highest amount of inhibition activity in the composition of the present invention. In other embodiments, the acid phase and the hydrocarbon phase can be mixed together at once and shaken by hand.

The mixing of the acid phase and hydrocarbon phase produces a dual-phase acid-in-hydrocarbon emulsion with two corrosion inhibitors. In certain embodiments, the acid-in-hydrocarbon emulsion is not a microemulsion.

In certain embodiments, the dual-phase acid-in-hydrocarbon emulsion can then be used in acid fracturing operations to fracture the formation rock while at the same time protecting the metal tubing and equipment in oil wells during both the injection and flowback phases.

In certain embodiments, the composition and methods described herein are effective for protecting tubulars, including steel corrosion resistant alloys such as Chrome 13 (13Cr; Hamilton Metals, Houston, Tex.) and superchrome tubing during acid fracturing operations employing highly corrosive strong acids.

In certain embodiments, the composition and methods described herein are effective for the protection of metal tubing and downhole equipment during acid fracturing operations employing concentrated hydrochloric acid (HCl); such as HCl solutions greater than 20% concentration by weight, or alternatively greater than about 25% concentration by weight.

In another embodiment, the dual-phase acid-based fracturing composition with two corrosion inhibitors can be injected into a formation. In certain embodiments, the hydrocarbon-soluble corrosion inhibitor forms a protective film on the metal tubing and downhole equipment of the oil and gas well. In certain embodiments, the hydrocarbon-soluble corrosion inhibitor film protects the metal tubing and downhole equipment from the corrosiveness of the acid in the composition during the injection phase. In certain embodiments, the acid-soluble corrosion inhibitor remains dissolved in the dual-phase acid-based fracturing composition.

In one embodiment, the dual-phase acid-based fracturing composition described herein is injected into the formation rock and the acid functions to dissolve, part or open fractures in the formation rock. In certain embodiments, once the acid has been "spent" in the formation rock, it can come back into contact with the metal tubing and downhole equipment in the oil and gas well. In one embodiment, the acid-soluble corrosion inhibitor can form a protective film on the metal tubing and downhole equipment. In certain embodiments, the acid-soluble corrosion inhibitor film protects the metal tubing and downhole equipment from the corrosiveness of the acid in the composition during the flowback phase.

EXAMPLES

The examples below used certain exemplary dual-phase acid-in-hydrocarbon emulsions, as described herein.

Example 1

The corrosion inhibiting properties of two acid-in-hydrocarbon compositions were compared by immersing a metal coupon in each composition and measuring the amount of metal corrosion. Two dual-phase acid-in-hydrocarbon emulsions were prepared—one with two corrosion inhibitors as described herein, and one with one corrosion inhibitor in the acid phase only. Two metal coupons were immersed in both emulsions at 130° Celsius and 700 psi for approximately 6 hours. After immersion, the weight loss of both coupons was measure and calculated. The weight loss of the metal was reduced by at least about 50% when two corrosion inhibitors were used as compared to one. Table 1 provides a comparison of the corrosion inhibition of an exemplary dual-phase acid-in-hydrocarbon emulsion against a composition that includes only one corrosion inhibitor present in the acid phase.

TABLE 1

| Temperature: | 130° C. | Pressure | 700 psi |
|---|---|---|---|
| Corrosion inhibitor in acid only | | | |
| Weight before soaking, g | | | 37.3826 |
| Weight after soaking, g | | | 37.2209 |
| Weight loss, g | | | 0.1617 |
| Weight loss, % | | | 0.43% |
| Two corrosion inhibitors, in hydrocarbon and acid phases | | | |
| Weight before soaking, g | | | 38.0302 |
| Weight after soaking, g | | | 37.9478 |
| Weight loss, g | | | 0.0824 |
| Weight loss, % | | | 0.21% |

Example 2

Two metal coupons were immersed in freshly prepared dual-phase acid-in-hydrocarbon emulsions. FIG. 1 shows a scanning electron microscope analysis of the surface of the metal coupon after immersion. The analysis of the fluid composition left on the metal shows that only the hydrocarbon-soluble corrosion inhibitor was used.

Example 3

Figure 2:
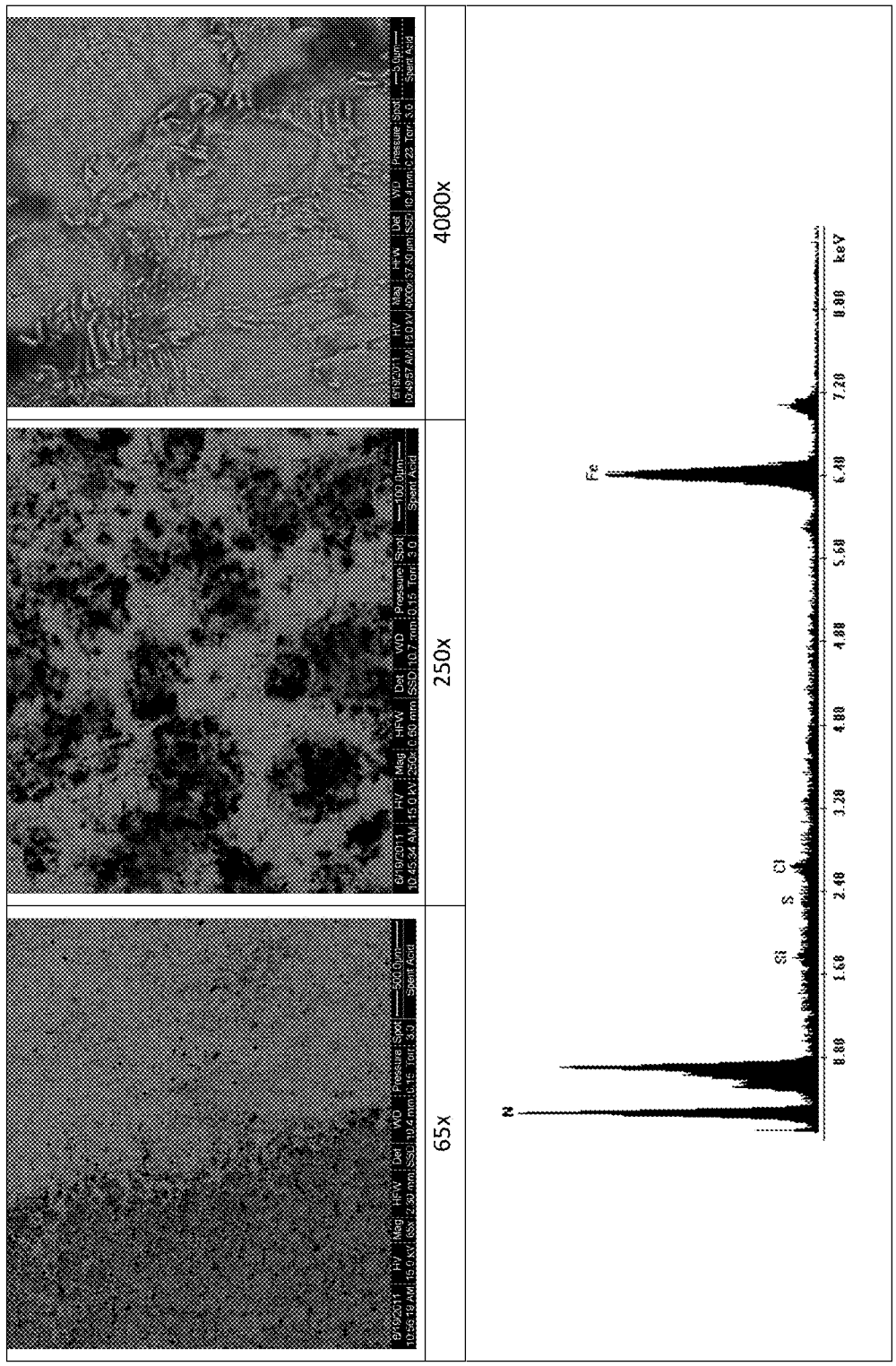
FIG. 2 provides scanning electron microscope analysis of the surface of a metal coupon after being treated with the "spent" acid, during the flowback phase according to embodiments of the present invention.

Two metal coupons were immersed, the first in freshly prepared dual-phase acid-in-hydrocarbon emulsion with two corrosion inhibitors, and the second in spent dual-phase acid-in-hydrocarbon emulsion with two corrosion inhibitors. The acid was spent by adding calcium carbonate to freshly prepared dual-phase acid-in-hydrocarbon emulsion with double corrosion inhibition. FIG. 1 and FIG. 2 show the scanning electron microscope analysis of both metal coupons. The availability of nitrogen in FIG. 2 shows that the metal coupon was coated with an aqueous amine-based corrosion inhibitor. FIG. 1 does not show nitrogen in the analysis which shows that the hydrocarbon-soluble corrosion inhibitor was coating the metal coupon. These results show the role of each corrosion inhibitor in each phase.

Examples 1 and 2 show that in an acid fracturing operation, if the present invention is utilized as described herein, the hydrocarbon-soluble corrosion inhibitor provides protection against the corrosion of the metal tubing and downhole equipment from the acid during the injection phase. The acid-soluble corrosion inhibitor will remain in the injected fluids. After the acid is injected into the formation rock and becomes "spent", the acid-soluble corrosion inhibitor remains available to protect the metal tubing and downhole equipment during the flowback phase of acid-based fracturing operations.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents, other products, or publications are referenced, the disclosures of these references in their entireties are intended to be incorporated by reference into this application, in order to more fully describe the state of the art to which the invention pertains, except when these reference contradict the statements made herein.

That which is claimed is:

1. A method for inhibiting acid corrosion in matrix acidizing and acid fracturing applications in oil and gas wells, the method comprising the steps of:
   preparing a dual-phase acid-based fracturing composition comprising
   a strong acid present in a concentration between 20% and 28% by weight that is operable to be diluted with treatment water and to dissolve formation rock;
   a liquid hydrocarbon comprising 5 or more carbon atoms;
   an emulsifier selected from the group consisting of an amine-based surfactant, linear alkyl amines and alkyl ammoniums;
   a hydrocarbon-soluble corrosion inhibitor comprising methanol and present in a range of 0.01% to 3% by volume relative to the amount of the liquid hydrocarbon in the composition and present in a hydrocarbon phase of the composition; and
   an acid-soluble corrosion inhibitor that does not have surfactant properties and present in an amount of up to 3% by volume relative to the amount of acid in the composition and present in an acid phase of the composition; and
   injecting the composition into an oil and gas well to cause fracturing, etching, or a combination thereof in the formation rock;
   wherein the emulsifier is present in concentrations in a range of from 0.05% to 1.5% by volume relative to the amount of liquid hydrocarbon;
   wherein the corrosion inhibitor present in the hydrocarbon phase of the dual-phase fracturing composition will be spent during the injection of stimulation fluids and the corrosion inhibitor present in the acid phase will be spent during the flowback.

2. The method of claim 1, wherein the emulsion is prepared by adding the acid phase to the hydrocarbon phase.

3. The method of claim 1, wherein the emulsion has a concentration of between about 50%-80% acid by volume.

4. The method of claim 1, wherein the emulsion is not a microemulsion.

5. The method of claim 1, wherein the liquid hydrocarbon comprises hydrocarbons ranging between about 10-15 carbon atoms.

6. The method of claim 1, wherein the liquid hydrocarbon comprises diesel.

7. The method of claim 1, wherein the liquid hydrocarbon comprises a diesel mixture that includes hydrocarbons ranging between about 10-15 carbon atoms.

8. The method of claim 1, wherein the strong acid is hydrochloric acid.

* * * * *